United States Patent [19]

Okubo et al.

[11] Patent Number: 4,958,711
[45] Date of Patent: Sep. 25, 1990

[54] ROTATIONAL SPEED DIFFERENTIAL RESPONSIVE TYPE JOINT

[75] Inventors: Takashi Okubo, Zama; Toji Takemura, Yokohama, both of Japan

[73] Assignee: Nissan Motor Co., Ltd., Yokohama, Japan

[21] Appl. No.: 251,175

[22] Filed: Sep. 30, 1988

[30] Foreign Application Priority Data

Oct. 2, 1987 [JP] Japan .................. 62-151237

[51] Int. Cl.$^5$ ............................ F16D 31/02
[52] U.S. Cl. ........................ 192/60; 192/82 T
[58] Field of Search ............ 192/60, 82 T, 58 B

[56] References Cited

U.S. PATENT DOCUMENTS

| | | | |
|---|---|---|---|
| 1,836,684 | 12/1931 | Robbins | 74/650 |
| 1,880,748 | 5/1930 | Bower | 192/60 |
| 2,352,023 | 6/1944 | Scholler | 179/100.2 |
| 2,440,975 | 5/1948 | Robbins | 74/389.5 |
| 2,498,801 | 9/1944 | Fraser | 192/60 |
| 2,511,518 | 11/1945 | Stephens | 192/60 |
| 3,198,035 | 8/1965 | Mueller | 74/650 |
| 3,368,425 | 2/1968 | Lewis | 74/720.5 |
| 3,577,803 | 5/1971 | Mueller | 192/60 |
| 3,766,804 | 10/1973 | Mori | 74/687 |
| 3,852,998 | 12/1974 | Leeson | 74/63 |
| 3,854,348 | 12/1974 | Stevenson | 74/774 |
| 3,923,113 | 12/1975 | Pagdin | 192/82 T X |
| 4,040,271 | 8/1977 | Rolt et al. | 192/82 T X |
| 4,387,795 | 6/1983 | Mueller | 192/60 |
| 4,703,842 | 11/1987 | Leinfellner et al. | 192/58 B |
| 4,762,213 | 8/1988 | Watanabe | 192/82 T |
| 4,828,088 | 5/1989 | Mohan et al. | 192/58 B |
| 4,850,465 | 7/1989 | Ono | 192/58 B |

FOREIGN PATENT DOCUMENTS

| | | |
|---|---|---|
| 2022469 | 11/1970 | Fed. Rep. of Germany . |
| 1939833 | 3/1971 | Fed. Rep. of Germany . |
| 60-116529 | 6/1985 | Japan . |
| 62-286838 | 12/1987 | Japan . |
| 63-62635 | 4/1988 | Japan . |
| 63-62636 | 4/1988 | Japan . |
| 214683 | 5/1941 | Switzerland . |
| 342598 | 2/1931 | United Kingdom . |
| 419294 | 11/1934 | United Kingdom . |

*Primary Examiner*—Edward K. Look
*Assistant Examiner*—John E. Ryznic
*Attorney, Agent, or Firm*—Foley & Lardner, Schwartz, Jeffery, Schwaab, Mack, Blumenthal & Evans

[57] ABSTRACT

A rotational speed differential type torque transmitting assembly includes a rotor rotatably disposed in a drive housing. During rotational speed differential between the rotor and drive housing, hydraulic fluid is discharged out of variable volume chamber on discharge stroke of the associated piston. Orifices are provided to restrict flow of hydraulic fluid discharged, inducing a pressure rise and adiabatic compression of the hydraulic fluid, causing heat build-up in the rotor. In order to prevent excessive rise in temperature of the assembly, a temperature responsive type spool valve is provided to close the orifice means in response to temperature rise of the hydraulic fluid in the rotor.

16 Claims, 5 Drawing Sheets

ROTATIONAL SPEED DIFFERENTIAL RESPONSIVE TYPE JOINT

CROSS-REFERENCE TO RELATED APPLICATIONS

U.S. Patent Application Ser. No. 058,209 filed on June 4, 1987 by the applicants.

U.S. Patent Application Ser. No. 193,628 filed on May 13, 1988 by the applicants.

BACKGROUND OF THE INVENTION

The present invention relates to a torque transmitting assembly primarily for use as a torque transfer/split unit for use with four wheel drive vehicles, and more particularly to a rotational speed differential responsive type joint.

The above-mentioned related U.S. Patent Applications each disclose a torque transmitting assembly. This torque transmitting assembly comprises a first rotary member integral with one of an input shaft and an output shaft and formed with a cam surface at its inner peripheral wall. Inserted into the first rotary member is a second rotary member integral with the other of the input shaft and the output shaft. Carried by the second rotary member are cam bodies. The cam bodies are received in radially outwardly opening cylindrical bores formed in the second rotary member and follow the surrounding cam surface of the first rotary member during relative rotational speed differential between the first and second rotary members to reciprocate to define variable volume chambers filled with hydraulic fluid. The supply of hydraulic fluid to and the discharge thereof from each of the variable volume chambers are effected by a hydraulic circuit. The hydraulic circuit is provided with flow restrictor means for restricting flow of hydraulic fluid displaced out of each of the variable volume chambers to cause a pressure increase which biases the associated cam body into firm engagement with the cam surface. In this manner, the transmission of torque is effected via the engagement of the cam bodies with the cam surface.

In this prior proposed torque transmitting assembly, the temperature of fluid is elevated when the assembly is subject to rotational speed differential. In normal use of the assembly, the temperature rise is not excessive and thus does not cause any problem. However, in a case where the motor vehicle passes though a frozen or muddy terrain continuously for a long time, the torque transmitting assembly is subject to rotational speed differential for an extended period of time, causing the temperature within the assembly to rise to an excessively high level. As a result, some component parts of the assembly which are too weak to withstand such excessive heat, such as parts made of rubber or plastic and oil, are damaged or at least have their operating lives shortened.

An object of the present invention is to provide an improved rotational speed differential responsive type torque transmitting assembly wherein the temperature rise due to rotational speed differential is restrained, thus preventing heat damage on the component parts of the torque transmitting assembly.

SUMMARY OF THE INVENTION

According to the present invention, the above-mentioned object has been solved by restraining rotational speed differential between first and second rotary member when the temperature of hydraulic fluid within the assembly is elevated.

More particularly, there is provided means for closing orifice means which the hydraulic fluid passes through upon rotation speed differential occurring between the first and second rotary members in response to temperature of the hydraulic fluid.

Specifically, in one form of the present invention, there is provided a torque transmitting assembly which comprises:

a first rotary member;

a second rotary member disposed in said first rotary member;

hydraulic fluid means for transmitting at least a portion of the input torque from one of said first rotary member and said second rotary member to the other in response to a rotational speed of said second rotary member and also to a rotational speed differential occurring between said first rotary member and said second rotary member, said hydraulic fluid means including an internal cam surface formed on said first rotary member and surrounding said second rotary member, cam followers in a radially outwardly opening bores formed in said second rotary member in slidable engagement with said cam surface and reciprocable in response to said rotational speed differential to define variable volume chambers in the associated radially outwardly opening bores, respectively, and orifice means for restricting flow of hydraulic fluid discharged from each of said variable volume chambers on the discharge stroke of the associated one of said cam followers; and means for preventing the flow of hydraulic fluid discharged from each of said variable volume chambers on the discharge stroke of the associated one of said cam followers in response to temperature of the hydraulic fluid.

In one embodiment of the present invention, said second rotary member has a radial wall formed with a plurality of discharge ports communicating with said variable volume chambers. Extending inward from an area of said radial wall disposed radially inward said discharge ports is an axial bore. An orifice plate is positioned in seal tight manner between said radial flat wall and an orifice plate retainer secured to said second rotary member. The orifice plate has a central opening. The orifice plate retainer includes a sleeve section and a radial section extending radially outward from one end portion of said sleeve section. The other end portion of the sleeve section is inserted past the central opening of said orifice plate into said axial bore with an annular clearance between the axial bore defining wall and the outer peripheral wall of the sleeve section. The other end portion of the sleeve section is formed with a land which engages in tight fit manner with an inwardly extending rib of the axial bore extending wall. Thus, the annular clearance is closed at one end by the radial section and at the opposite end by the land engaging with the rib. The orifice plate also has a plurality of cutouts extending radially outward from the central opening. The cutouts are positioned in registry With the discharge ports, respectively, to define said orifice means for restricting hydraulic fluid discharged out of said discharge ports toward the annular clearance space. The other end portion of the sleeve section is formed with a plurality of radial openings which allow the passage of the hydraulic fluid from said annular clearance toward the inside the sleeve section of the orifice retainer. Slidably received in the sleeve section is a bored spool valve. The bored spool valve is normally biased by a return spring to a spring set position where it opens the radial openings. A shape memory spring is disposed inside the bored spool valve. The shape memory spring is made of a shape memory alloy and takes an extended shape when the temperature of the hydraulic fluid exceeds a predetermined value. In the extended shape, the shape memory alloy urges the bored spool valve against the return spring to a predetermined position where the spool valve closes the radial openings.

DETAILED DESCRIPTION OF THE INVENTION

Referring to the accompanying drawings, the present invention is described along with the preferred embodiment illustrated. In the embodiment, the present invention is embodied as a rotational speed differential responsive type joint provided in a drive train of a four wheel drive vehicle of the front engine front drive type.

Referring to FIGS. 1 to 7, the preferred embodiment of a rotational speed differential responsive type joint A is described.

Figure 7:
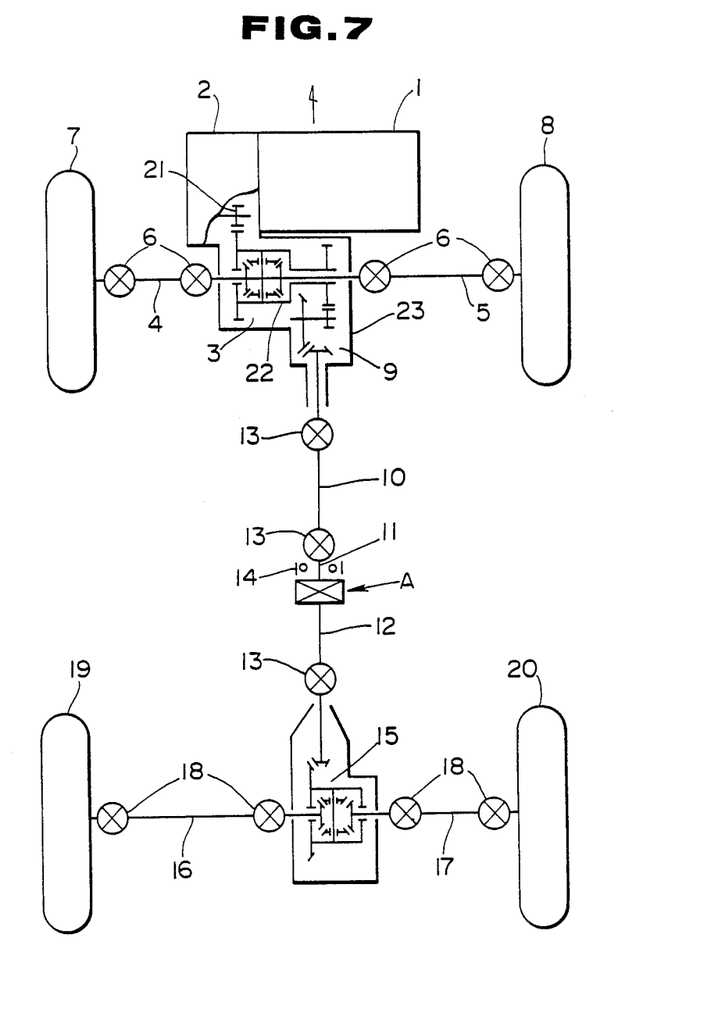
FIG. 7 is a schematic top plan view of a four wheel drive vehicle containing the torque transmitting assembly according to the present invention.

As shown in FIG. 7, the rotational speed differential responsive type joint A is provided in a rear wheel drive system of a four wheel drive automotive vehicle employing a front drive as a base. It is used as a center differential and a torque split system for transfer of torque to rear wheels.

Regarding the drive systems of the four wheel drive vehicle which the preferred embodiment of the joint A is applied to, the front wheel drive system comprises an engine 1, a transmission (including a clutch) 2, a front differential 3, front drive shafts 4, 5, front drive shaft joints 6, and front wheels 7, 8, whereas the rear wheel drive system comprises a transfer gear train 9, a front propeller shaft 10, a center propeller shaft 11, the above-mentioned rotational speed differential responsive type joint A, a rear propeller shaft 12, a propeller shaft joint 13, a center bearing 14, a rear differential 15, rear drive shafts 16, 17, rear drive shaft joints 18, and rear wheels 19, 20. The center propeller shaft 11 and rear propeller shaft 12 serve as an input shaft to and an output shaft from the rotational speed differential responsive type joint A, respectively.

The construction of the rotational speed differential responsive type joint A is explained.

Figure 1:
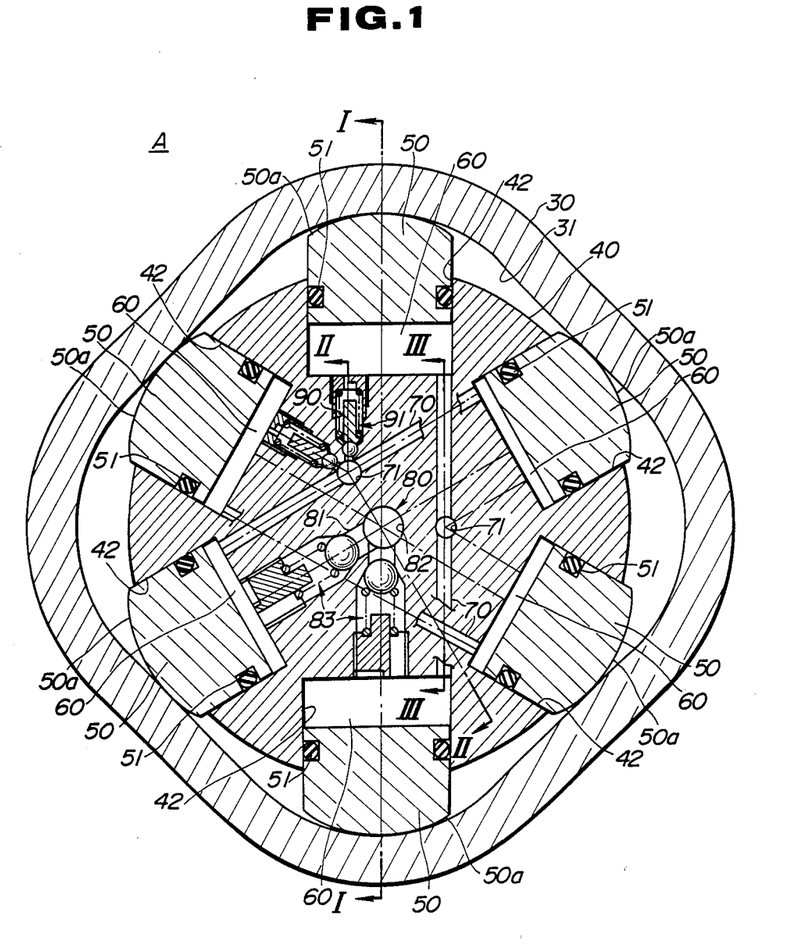
FIG. 1 is a radial section of a preferred embodiment of a torque transmitting assembly according to the present invention.
Figure 2:
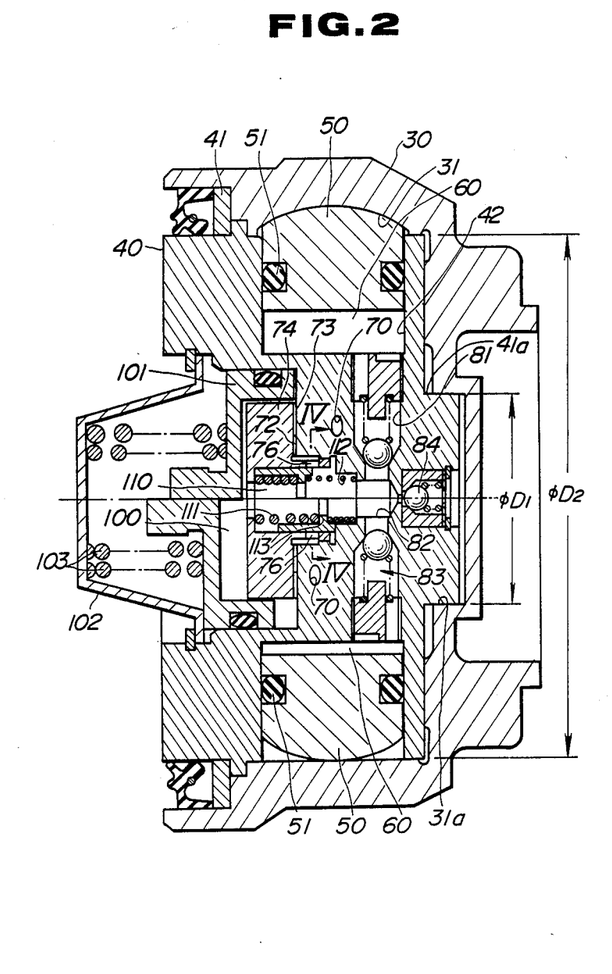
FIG. 2 is a section taken through the line I—I of FIG. 1.

As shown in FIGS. 1 and 2, the rotational speed differential responsive type joint A comprises a first rotary member in the form of a drive housing 30, a second rotary member in the form of a rotor 40, cam bodies in the form of driving pistons 50, radially outwardly opening bores in the form of cylindrical bores 42, variable volume hydraulic fluid chambers in the form of cylindrical chambers 60, balance passages 70, regulator and relief passage 80, and an accumulator chamber 100.

The drive housing 30 is fixedly secured to the input shaft in the form of the center propeller shaft 11 by means of bolts. Formed in the inner peripheral wall of the drive housing 30 is an internal cam surface 31. The cam surface 31 is contoured such that at any angular position of the rotor 40 relative to the drive housing 30, substantially the same ratio of the input torque is transmitted from the rotor 40 to the drive housing 30 upon occurrence of a rotational speed differential between the rotor 40 and drive housing 30.

The rotor 40 is disposed in the drive housing 30 and surrounded by the cam surface 31. It is fixedly secured to the output shaft in the form of the rear propeller shaft 12 by means of bolts. Axial movement of the rotor 40 relative to the drive housing 30 is prevented by a stop plate 41 (see FIG. 2) secured to the drive housing 30 by means of screws, not shown, even though relative rotational movement is permitted. As best seen in FIG. 1, the rotor 40 is formed with six such radially outwardly opening cylindrical bores 42 having one ends opening and opposed to the cam surface 31. These cylindrical bores 42 have their opening ends positioned equi-angularly distant one after another.

As best seen in FIG. 2, the rotor 40 has a reduced diameter bearing shaft 41a rotatably received in a bearing bore 31a which the drive housing 30 is formed with whereby the rotor 40 is rotatably supported by the drive housing 30. The dimensional setting is such that the diameter $\phi D_1$ of the reduced diameter bearing shaft 41a is smaller than the minor inner diameter $\phi D_2$ of the cam surface 31 of the drive housing 30. The rotor 40 is disposed in the drive housing 30 such that the outer peripheral wall of the rotor 40 is in spaced opposed relationship with the inner wall of the drive housing 30 including the cam surface 31 although not seen in FIG. 2. Under cold weather conditions, the rotor 40 expands more than the drive housing 30 expands owing to heat build-up inside the rotor 40 during rotational speed differential since the rotor 40 is not exposed to cold atmosphere, while the drive housing 30 is exposed to. Since this heat expansion differential between the rotor 40 and the drive housing 30 owing to this temperature gradient can not be removed nor prevented, what is done by this rotatably supporting arrangement is to support the rotor 40 at the reduced diameter shaft 31a and provide enough clearance between the outer peripheral wall of the rotor 40 and the inner wall of the drive housing 30. With the same amount of heat which the rotor 40 is subject to, the radial expansion of reduced diameter bearing shaft 41a becomes less as the diameter becomes less. Thus, the diameter of the reduced diameter shaft 41a is set such that a sufficient bearing clearance between the peripheral wall of the reduced diameter bearing shaft 41a and the bearing bore 31a wall is always maintained because the radial dimension of o such bearing clearance cannot be increased. As a result, the seizure at the bearing portion owing to the heat expansion differential between the rotor 40 and drive housing 30 is prevented.

The driving pistons 50 are slidably disposed in the associated cylindrical bores 42, respectively, in a fluid tight manner with seal rings 51. Each of the driving pistons 50 has a spherical rounded top ends 50a in sliding engagement with the cam surface 31. The radius of curvature of each of the rounded top ends 50a is set longer than the radius of a driving ball which would slidably fit in the associated cylindrical bore 42 although t is set shorter than the radius of curvature of any portion of the cam surface 31. This setting is effective for increased structural strength to high torque transmission.

The variable volume cylindrical chambers 60 are defined in the cylindrical bores 42 by the associated driving pistons 50, respectively. Each of the cylindrical chambers 60 is subject to a volume change as the associated driving piston 50 strokes.

Figure 3:
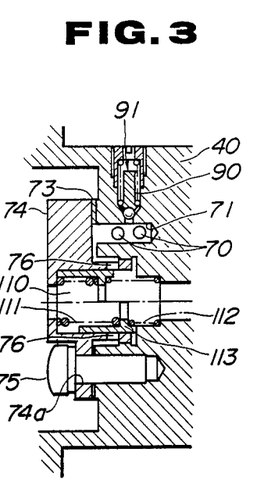
FIG. 3 is a section taken through the line II—II of FIG. 1.
Figure 4:
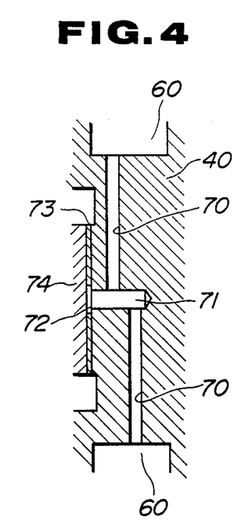
FIG. 4 is a section taken through the line III—III of FIG. 1.
Figure 5:
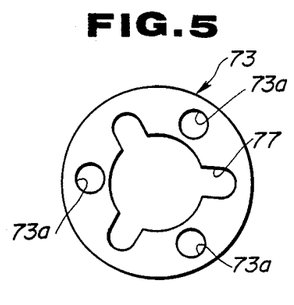
FIG. 5 is a plan view of an orifice plate.
Figure 6:
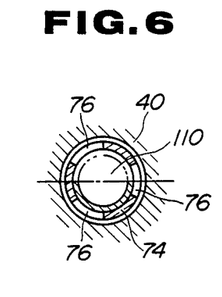
FIG. 6 is a section taken through the line IV—IV of FIG. 2.

The three balance passages 70 are formed in the rotor 40, each interconnecting the cylindrical chambers 60 with the same phase during reciprocal stroke of the driving pistons 50. They have axial branch passages 71, respectively. Radially extending from each of the axial branch passages 71 to the adjacent two cylindrical chambers 60 are two radial passages 90 with one-way check valves 91. There are three axial branch passages 71 having one ends closed and opposite ends terminating at discharge ports, respectively, which a radial substantially flat wall of the rotor 40 is formed with. Extending inward from an area of the radial wall disposed radially inward of the discharge ports is an axial bore for receiving an orifice retainer 74. An orifice plate 73 is positioned in fluid tight manner between the radial wall of the rotor 40 and the orifice plate retainer 74 secured to the rotor 40 by means of bolts 75 extending through bolt holes 74a of the retainer 74 and bolt holes of the orifice plate 73. The orifice plate 73 has a central opening. The orifice plate retainer 74 includes a sleeve section and a radial section extending radially outward from a lefthand end portion of the sleeve section as viewed in FIG. 3. The other or righthand end portion (viewing in FIG. 3) of the sleeve section is inserted past the central opening of the orifice plate 73 into the axial bore of the rotor 40 with an annular clearance between the axial bore defining wall and the outer peripheral wall of the sleeve section as best seen in FIG. 3. The other end portion of the sleeve section is formed with a land which engages in tight fit manner with an inwardly extending rib of the axial bore extending wall. Thus, the annular clearance is closed at one end by the radial section of the retainer 74 and at the opposite end by the land engaging with the rib. As best seen in FIG. 5, the orifice plate 73 also has three cutouts 77 extending radially outward from the central opening thereof. The cutouts 77 are positioned in registry with the discharge ports which the axial branch passages 71 are terminated at, respectively, to define orifices, only one being shown at 72 in FIG. 4, for restricting hydraulic fluid discharged out of the discharge ports toward the annular clearance space. The other end portion of the sleeve section is formed with a plurality of radial openings 76 which allow the passage of the hydraulic fluid from the annular clearance toward inside the sleeve section of the orifice retainer 74. Slidably received in the sleeve section of the orifice retainer 74 is a bored spool valve 113. The bored spool valve 113 is normally biased by a return spring 112 to a spring set position where it opens the radial openings 76 as illustrated by the upper half thereof in FIG. 3. A shape memory spring 111 is disposed in a spool bore 110 inside the bored spool valve 113. The shape memory spring 111 is made of a shape memory alloy and takes an extended shape, as illustrated by the lower half portion thereof in FIG. 3, when the temperature of the hydraulic fluid exceeds a predetermined value. In the extended shape, the shape memory spring 111 urges the bored spool valve 113 against the return spring 112 to a predetermined position (as illustrated by the lower half portion of the bored spool valve 113) where the spool valve 113 closes the radial openings 76. As will be readily understood from FIG. 3, the return spring 112 has one end bearing against a shoulder formed in the axial bore of the rotor 40 and the opposite end bearing against an inwardly projecting rib of the spool valve 113, while the shape memory spring 111 has one end bearing against an inwardly extending extension of the retainer 74 and the opposite end bearing against the inwardly projecting rib of the bore spool valve 113.

Referring to FIG. 2, the orifice plate retainer 74 is surrounded by an accumulator piston 101 which is fit in fluid tight manner in the rotor 40 for axial reciprocal movement relative to the rotor 40 in response to the pressure variation of the hydraulic fluid within an accumulator chamber 100. The accumulator piston 101 is biased toward a spring set position thereof as illustrated by an upper half portion thereof in FIG. 2 by means of dual springs 103 operatively disposed between the accumulator piston 101 and a cap like spring retainer 102. The spool bore 110 of the bored spool valve 113 has a lefthand end communicating with the accumulator chamber 110 so that the discharged hydraulic fluid having entered the spool bore 110 via the radial openings 76 enters the accumulator chamber 100.

The regulator and relief passage 80 is provided to establish communication between the accumulator chamber 100 and every other one of the cylindrical chambers 60, and it comprises a central axial passage 82 and three radial passages 81 extending radially from the central axial passage 82. As best seen in FIG. 2, the central axial passage 82 communicates via the axial bore with the spool bore 110 of the spool valve 113. Provided in each of the radial passages 81 is a one-way valve shown generally at 83 arranged to permit one-way flow of hydraulic fluid to the associated cylindrical chamber 60 from the accumulator chamber 100 only. A relief valve 84 is provided at the central axial passage 82 to allow escape of the hydraulic fluid from the central axial passage 82.

The accumulator chamber 100 is variable to absorb a change in volume of hydraulic fluid contained in the cylindrical chambers 60, balance passages 70, and regulator and relief passage 80.

The operation of the rotational speed differential responsive type joint A as being installed in the four wheel drive as shown in FIG. 7 is explained.

Figure 8:
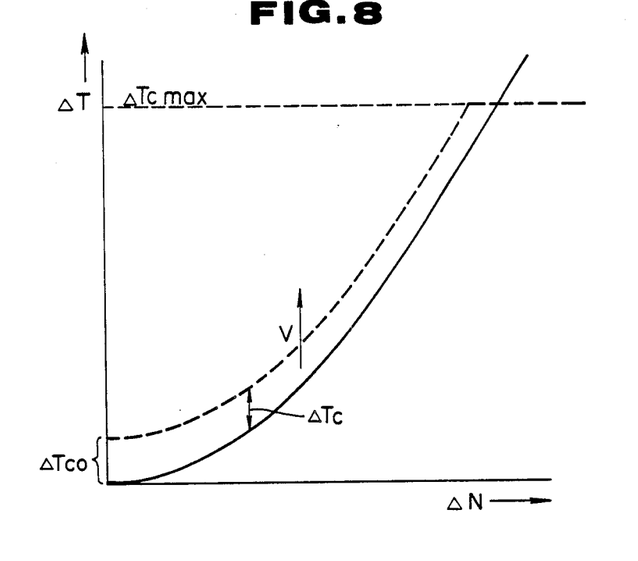
FIG. 8 shows a torque transmission characteristic by the torque transmitting assembly according to the present invention.

(A) In the case where there is no rotational speed differential, viz., $\Delta N = 0$:

Under an operating condition where there is no rotational speed differential $\Delta N$ (delta N), the driving pistons 50 will not reciprocate. Since the driving pistons 50 are thrown radially outward due to centrifugal force as the drive housing 30 rotates, the rounded top faces of the driving pistons 50 increase their engagement with the cam surface 31 as the speed of rotation of the drive housing 30 increases. The centrifugal force increases in proportion to the square of the speed V of rotation of the rotor 40, so that the transmission of torque from the rotor 40 to the drive housing 30, viz., ΔTc (delta Tc), increases in proportion to the square of the speed V of rotation of the rotor 40, as shown in FIG. 8. The transmission of torque Tc to the drive housing 30 and then to the rear propeller shaft 12 connecting to the rear wheels 19, 20 occurs when the vehicle runs at high speeds. The stability at high speed running is thus increased.

As will now be understood, the vehicle acts as a two wheel drive vehicle when it runs substantially straight on a dry road at low or intermediate speeds, whereas it acts as a four wheel drive vehicle when it runs substantially straight at high speeds.

(B) In the case where there occurs a rotational speed differential, viz., ΔN being greater than 0:

In its operating condition where a rotational speed differential ΔN (delta N) occurs between the rotor 40 and the drive housing 30, the driving pistons 50 reciprocate to provide a pumping action. To permit hydraulic fluid to be displaced from a pair of diametrically opposed cylindrical chambers 60 on the discharge strokes of the driving pistons 50, the pair of the cylindrical chambers 60 are in communication with the accumulator chamber 100 via the balance passage 70 and the common orifice 72 provided in the axial passage 71. To replenish the hydraulic fluid from the above-mentioned accumulator chamber 100 to another pair of diametrically opposed cylindrical chambers 60 on the suction strokes of the driving pistons 50, the regulator passages 81, 82 allow a one-way flow of hydraulic fluid from the accumulator chamber 100 to the another pair of diametrically opposed cylindrical chambers 60. When such reciprocation occurs, the hydraulic fluid can be discharged from each cylindrical chamber 60 on the discharge stroke of the associated driving piston 50 at a rate determined by the orifice 72. The transmission of torque from the rotor 40 to the drive housing 30, viz., ΔT (delta T), is determined by the algebraic su of forces with which the driving pistons 50 are urged to engage with the cam surface 31. Each force is the product of the effective pressure acting area of each driving piston 50 and the pressure of hydraulic fluid within the associated cylindrical chamber 60. The pressure of the hydraulic fluid within the cylindrical chamber 60 on the discharge stroke is determined owing to the flow resistance imparted on the flow of hydraulic fluid discharge from the cylindrical chamber by the associated orifice 72. The pressure within the cylindrical chamber 60 on the discharge stroke becomes great as the rotational speed differential ΔN (delta N) increases. Thus, the greater the amount of the rotational speed differential ΔN (delta N), the greater will be the transmission of torque ΔT (delta T) that is transmitted to the rear propeller shaft 12 and then to the rear wheels 19, 20. The curve shown in a solid line in FIG. 8 illustrates the characteristic of ΔT versus ΔN. As described before, the greater the vehicle speed V, the greater will be the transmission of torque ΔTc. Thus, the actual transmission of torque to the rear wheels 19, 20 is the sum of ΔT and ΔTc. The broken line curve shown in FIG. 8 illustrates the characteristic of this actual transmission of torque when the vehicle speed V is fixed at a certain value. Therefore, the extent of transmission of torque to the rear wheels 19, 20 is variable in response to the rotational speed differential ΔN and vehicle speed V.

It will now be recognized that, when the front wheels 7, 8 have lost their traction and are slipping, the vehicle shifts from the two wheel drive state to the four wheel drive state in accordance with the extent to which the front wheels 7, 8 slip. As a result, the start-up performance and the acceleration performance of the vehicle increases. The travelling performance of the vehicle on passing through an area covered with ran or snow increases. Besides, even if the front wheels 7, 8 have lost traction when passing through muddy terrain, the torque is transmitted to the rear wheels 19, 20, so that the ability of the vehicle to pass through such rough terrain is enhanced.

The orifices 72 are defined within the cutouts 77 formed in the orifice plate 73 between the radial wall of the rotor 40 so that each of them has an increased wetted length. This structure is effective in suppressing noise due to jet streams of hydraulic fluid created during torque transmission under rotational speed differential between the rotor 40 and drive housing 30.

On the discharge stroke of each driving piston 50, the hydraulic fluid discharged from the associated cylindrical chamber 60 flows through the passages 70 and 71, orifice 72 where it is subject to flow restriction, radial openings 76 and spool bore 110 to the accumulator chamber 100. The flow restriction at each of the orifice 72) induces an adiabatic compression of the hydraulic fluid upstream the orifices 72, causing a heat build-up within the rotor 40. The heat build-up is low when the rotational speed differential is small. The temperature rise of the rotor 40 remains lower than an acceptable level even where the rotational speed differential is large unless over an extended period o of time because the heat is dissipated and absorbed by the other component parts. However, there tends to occur a high temperature rise of the hydraulic fluid within the rotor 40 when the torque transmitting assembly A is subject to a large rotational speed differential continuously over extended period of time, heating the component parts. Among the component parts, there are seal rubbers and seal rings made of resin which tend to deteriorate when exposed to high temperature over extended period of time. The above-mentioned operating condition takes place when the vehicle climbs up a snow covered long slope or when the vehicle passes through a terrain covered with powder sand towing a boat or the like. The temperature of the component parts of the torque transmitting assembly A increases up to 120° C. under this operating condition, thus deteriorating seal rubbers and seal rings. Beside, the lubrication function of hydraulic fluid becomes bad. However, according to the present invention, the bored spool 113 closes the radial openings 76 to prevent discharge of hydraulic fluid toward the accumulator chamber 110 before the temperature of hydraulic fluid increases to such an unacceptable high value, preventing movement of hydraulic fluid and thus suppressing rotational speed differential between the rotor 40 and the drive housing 30.

The shape memory spring 111 is exposed to the temperature of hydraulic fluid within the spool bore 110. When the hydraulic fluid temperature is increasing but still lower than a first predetermined value, the shape memory spring 111 takes its contraction state as indicated by the illustrated upper half portion thereof in FIG. 2 and thus does not urge the bored spool valve 113 against the return spring 112. When the hydraulic fluid temperature exceeds the first predetermined value the shape memory spring 111 takes the extended state as indicated by the illustrated lower half portion thereof in FIG. 2 and thus urges the bored spool 113 against the return spring 112 to the position where the bore spool 113 closes the radial openings 76. This causes the movement of hydraulic fluid within the rotor 40 to stop, thus restraining the rotational speed differential between the rotor 40 and the drive housing 30 to stop. Thereafter, the heat is gradually dissipated to the ambient atmosphere so that the hydraulic fluid temperature drops gradually.

When the hydraulic fluid temperature drops below the first predetermined value but still higher than a second value which is set lower than the first predetermined value, the shape memory spring 111 remains in the extended state and thus the bored spool valve 113 keeps on closing the radial openings 76. However, when the hydraulic fluid temperature drops further and becomes below the second predetermined value, the shape memory spring 111 shifts to the contraction state, thus allowing the bored spool 113 to move the spring set position owing to the bias of the return spring 112. When the bored spool valve 113 has moved back to the spring set position, the radial openings 76 are opened again to allow movement of hydraulic fluid toward the accumulator chamber 100 past the orifices 72. Owing to this hysteresis, so-called hunting will not occur. In this manner, the bored spool valve 113 closes the o radial bores 76 well before the temperature of the torque transmitting assembly A reaches the fatal high temperature value. This means that a vehicle installed with the torque transmitting assembly can keep on passing through the above-mentioned terrains without any interruption.

When the vehicle installed with the torque transmitting assembly A travels at a high speed on a road with a very low friction coefficient, the rotational speed differential between front and rear wheels of the vehicle tend to increase. But, this tendency is suppressed by the torque transmission assembly A according to the present invention. Thus, the vehicle running performance on passing through such slippery road is enhanced as compared to a vehicle installed with a conventional torque transmitting assembly of the same type.

In the previous description, the present invention is embodied in the differential speed responsive type torque transmitting assembly of the one including driving pistons. However, the present invention may be applied to another type of rotational speed differential responsive torque transmitting assembly.

In the previously described embodiment, a spring of a shape memory alloy is used which serves as a temperature sensor and also an actuator for a bored spool which is adapted to close radial openings. A bimetal type spring responsive to the hydraulic fluid temperature may be used. It is also possible to use a temperature sensor responsive to the hydraulic fluid temperature in operative association with an actuator.

What is claimed is:

1. A torque transmitting assembly comprising:
a first rotary member;
a second rotary member disposed in said first rotary member;
hydraulic fluid means for transmitting at least a portion of the input torque from one of said first rotary member and said second rotary member to the other in response to a rotational speed differential occurring between said first and said second rotary members,
said hydraulic fluid means including an internal cam surface formed on said first rotary member and surrounding said second rotary member, pistons mounted in said second rotary member in slidable direct contact with said cam surface and reciprocable in response to said rotational speed differential to define variable volume chambers in said second rotary member, and means for restricting flow of hydraulic fluid discharge from each of said variable volume chambers on the discharge stroke of the associated one of said pistons for transmitting torque through said direct contact between said pistons and said cam surface; and
means responsive to a temperature of the hydraulic fluid discharged from variable volume chambers for automatically preventing said rotational speed differential between said first and second rotary members when said temperature of the hydraulic fluid is higher than a predetermined temperature value.

2. A torque transmitting assembly as claimed in claim 1, wherein said rotational speed differential preventing means include means for closing said flow restricting means in response to temperature of the hydraulic fluid.

3. A torque transmitting assembly comprising:
a first rotary member;
a second rotary member disposed in said first rotary member;
hydraulic fluid means for transmitting at least a portion of the input torque from one of said first rotary member and said second rotary member to the other in response to a rotational speed of said second rotary member and also to a rotational speed differential occurring between said first rotary member and said second rotary member,
said hydraulic fluid means including an internal cam surface formed on said first rotary member and surrounding said second rotary member, cam followers in radially outwardly opening bores formed in said second rotary member in slidable direct contact with under the action of said return spring when said temperature of said hydraulic fluid fails to be higher than said predetermined temperature value.

4. A torque transmitting assembly as claimed in claim 3, wherein said second rotary member has a radial wall formed with a plurality of discharge ports communicating with said variable volume chambers.

5. A torque transmitting assembly as claimed in claim 4, wherein said second rotary member is formed with an axial bore extending inward from that area of said radial wall which is disposed radially inward of said discharge ports.

6. A torque transmitting assembly as claimed in claim 5, wherein said orifice defining means include an orifice plate positioned in a seal tight manner between said radial wall and an orifice plate retainer secured to said second rotary member.

7. A torque transmitting assembly as claimed in claim 6, wherein said orifice plate has a central opening, and said orifice plate retainer includes a sleeve section and a radial section extending radially outward from one end portion of said sleeve section.

8. A torque transmitting assembly as claimed in claim 7, wherein the other end portion of said sleeve section is inserted past the central opening of said orifice plate into said axial bore with an annular clearance between the axial bore defining wall and the outer peripheral wall of said sleeve section.

9. A torque transmitting assembly as claimed in claim 8, wherein said other end portion of said sleeve section is formed with a land which engages in a tight fit manner with an inwardly extending rib of the radial, whereby the annular clearance is closed at one end by the radial section of said orifice retainer and at the opposite end by said land engaging with said rib.

10. A torque transmitting assembly as claimed in claim 9, wherein said orifice plate also has a plurality of cutouts extending radially outward from the central opening thereof.

11. A torque transmitting assembly as claimed in claim 10, wherein the cutouts of said orifice plate are positioned in registry with said discharge ports of said radial wall of said second rotary member, respectively, to define said orifice means.

12. A torque transmitting assembly as claimed in claim 11, wherein the other end portion of the sleeve section of said orifice plate retainer is formed with a plurality of radial openings which allow the passage of the hydraulic fluid from said annular clearance toward the inside the sleeve section of said orifice retainer.

13. A torque transmitting assembly as claimed in claim 12, wherein said valve is a bored spool valve slidably received in the sleeve section of said orifice plate retainer.

14. A torque transmitting assembly as claimed in claim 13, wherein said bored spool valve is normally biased by a return spring to a spring set position where it opens the radial openings.

15. A torque transmitting assembly as claimed in claim 14, wherein said shape memory spring is disposed inside the bored spool valve, said shape memory spring being made of a shape memory alloy.

16. A torque transmitting assembly as claimed in claim 15, wherein when it is in said extended shape, said shape memory spring urges said bored spool valve against said return spring to a predetermined position where said spool valve closes the radial openings.

* * * * *